United States Patent Office 2,810,001
Patented Oct. 15, 1957

2,810,001

PRODUCTION OF DICYCLIC OLEFINS AND DERIVATIVES

Herbert K. Wiese, Cranford, N. J., assignor to Esso Research and Engineering Company, a corporation of Delaware No Drawing. Application July 7, 1951,
Serial No. 235,677

5 Claims. (Cl. 260—666)

This invention relates to a method for transforming a tertiary chloride of an alkyl cyclopentane into dicyclic chlorides which can be dehydrochlorinated to useful dicyclic olefins that on selective dehydrogenation become converted mainly to aromatic hydrocarbon derivatives, more particularly alkyl naphthalenes.

In brief, the process of the present invention is concerned with the following reaction steps:

(1) The formation of dicyclic chlorides from tertiary chlorides of cyclopentanes, more particularly as they are formed in reacting an alkyl cycloalkane with a tertiary alkyl chloride in the presence of strong sulfuric acid.

(2) Dehydrochlorination of the dicyclic chlorides to produce dicyclic olefins and hydrogen chloride.

(3) Selective dehydrogenation of the dicyclic olefins to form aromatic hydrocarbon derivatives.

This invention is based upon the discovery that in the presence of strong sulfuric acid as catalyst two molecules of a tertiary chloro-alkyl cyclopentane condense to produce one molecule of dicyclic chlorides and one molecule of hydrogen chloride. Thus with 1-chloro-1-methylcyclopentane, for example, the reaction can be written as follows:

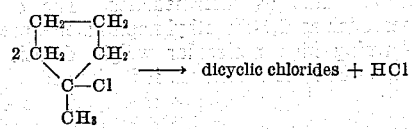 → dicyclic chlorides + HCl       (1)

Since in this condensation step the cyclopentane ring is simultaneously isomerized producing to a major extent compounds containing a fused ring structure, such as chloro-dimethyldecalins when employing 1-chloro-1-methylcyclopentane, it is thus possible, for example, to dehydrochlorinate the dicyclic chloride to dicyclic olefins which on selective dehydrogenation become converted to alkylnaphthalenes. It is of course understood that the dicyclic chlorides and particularly the dicyclic olefins can be subjected to various reactions for producing desired final products. For example, the dicyclic olefins may be oxonated or oxidized to form dibasic acids. They may be chlorinated to obtain chlorides which are useful in insecticide and fungicide compositions.

The tertiary chloro-cyclopentanes can be produced using any known procedure, such as the addition of hydrogen chloride to a tertiary alkyl-cyclopentene. The chlorination of a saturated alkylcyclopentane or the reaction of a tertiary cyclopentanol with hydrogen chloride can also be employed.

An alternate procedure for the production of tertiary chloro-cyclopentanes, which utilizes readily available materials, consists of a selective halogen-hydrogen exchange reaction between an alkylcyclopentane and a tertiary chlorohydrocarbon of the aliphatic series. This step is a continuation-in-part of application, Serial Number 156,038, filed April 14, 1950, now abandoned. This method can best be illustrated by the following reaction, using for example methylcyclopentane as the alkylcyclopentane and tertiary butyl chloride as the aliphatic tertiary chloro-hydrocarbon:

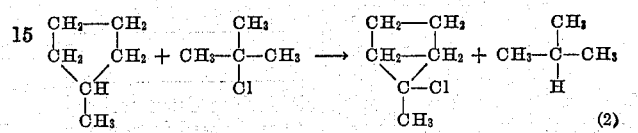

Methylcyclopentane + tertiary butyl chloride → 1-chloro-1-methylcyclopentane + isobutane As is evident from this illustration a tertiary chloroalkylcyclopentane is produced by reacting a saturated alkylcyclopentane with an aliphatic tertiary chloro-hydrocarbon. The aliphatic tertiary chloro-hydrocarbon is converted to the corresponding saturated aliphatic hydrocarbon.

However, under the conditions employed to effect reaction (2) it is generally impossible to prevent reaction (1) which consists of the condensation of the tertiary chloro-alkylcyclopentane to the dicyclic chlorides, to take place to some extent. The extent of reaction (1) depends on the contact time and also on the concentration of the tertiary chloro-alkylcyclopentane that has been allowed to build-up in the reaction mixture. Depending on conditions employed varying ratios of tertiary chloroalkylcyclopentanes to dicyclic chlorides can be obtained. However, from the standpoint of this invention conditions are chosen which result in the formation of dicyclic chlorides as the predominant product.

The steps just described can best be summarized as the formation of dicyclic chlorides from tertiary chloro-alkylcyclopentanes as they are formed in reacting an alkylcyclopentane with an aliphatic tertiary chloro-hydrocarbon.

The conditions for condensing a tertiary chloro-alkylcyclopentane consist of contacting the tertiary chloride with 85–100% sulfuric acid at about −10 to 25° C., preferably 0 to 10° C. The ratio of tertiary chloroalkylcyclopentane/sulfuric acid catalyst can vary over wide limits ranging from 10/1 to 1/10 depending on the reactant and conditions employed. Although it is not necessary to have a diluent present in many instances a diluent such as a straight chain paraffin or an alkylcyclopentane having the same carbon structure as the chloride is desirable. A hydrogen chloride partial pressure is maintained over the reaction mixture. It can vary from 0.1 to 5 atm. or higher but is preferably maintained between 0.1 to 2 atm. The hydrogen chloride pressure is attained by making use of the hydrogen chloride evolved in the reaction. However, it is generally preferred to saturate the catalyst and diluent phase with extraneous hydrogen chloride prior to the addition of the tertiary chloro-methylcyclopentane.

To demonstrate the feasibility of this reaction the results of a run in which 1-chloro-1-methylcyclopentane was contacted with 96% sulfuric acid are summarized below:

TABLE I

*Condensation of 1-chloro-1-methylcyclopentane to dicyclic chlorides in the presence of strong sulfuric acid as catalyst*

| | |
|---|---|
| Experiment No. | 822–7 |
| Conditions of experiment: | |
|    Temperature, °C | 5 |
|    Contact time, hrs. | 0.5 |
|    Total HCl pressure, p. s. i. g. | 1.5 |
|    Diluent use | methylcyclopentane |
|    Vol. ratio of diluent/96% H$_2$SO$_4$ | 1 |
|    Vol. ratio of 1-chloro-1 methylcyclopentane/ 96% H$_2$SO$_4$ | 0.32 |
| 1-chloro-1-methylcyclopentane converted, mole percent | 62 |
| Selectivity to, mole percent: | |
|    Dicyclic chlorides (C$_{12}$H$_{21}$Cl) | 52 |
|    Dicyclic hydrocarbons (C$_{12}$H$_{22}$) | 32 |
|    Other material not identified | 13.5 |

In a process for preparing dichlorides from teritary chloro-alkylcyclopentanes as they are formed in reacting an alkylcyclopentane with a teritary chloro-hydrocarbon of the aliphatic series, an available aliphatic tertiary chloride, e. g., tertiary butyl chloride, is contacted with the alkylcyclopentane, such as methyl- or dimethylcyclopentane, in the presence of 85–100% sulfuric acid at about −10 to 25° C., preferably 0 to 10° C. The aliphatic tertiary chloride reactant can be added all at once or in increments over the entire reaction period. The volume ratio of alkylcyclopentane/sulfuric acid can vary over a range from 10/1 to 1/10, preferably from 2/1 to 5/1. The mole ratio of alkylcyclopentane/aliphatic tertiary chloride can vary from 1/1 to 20/1 or more. The hydrogen chloride pressure maintained over the reaction mixture is similar to that disclosed above.

A representative run for producing satisfactory yields of dicyclic chlorides from methylcyclopentane when reacted with tertiary butyl chloride using 96% sulfuric acid as catalyst is tabulated with a compared run in which the contact time was shortened to obtain chiefly a good yield of 1-chloro-1-methylcyclopentane in the following Table II.

TABLE II

*Reaction of methylcyclopentane with tertiary butyl chloride in the presence of concentrated sulfuric acid*

| Experiment No. | 608–3 | 608–11 |
|---|---|---|
| Conditions of Experiment: | | |
|   Temperature, °C | 2 | 3 |
|   Contact Time, Hrs | 6 | 0.5 |
|   Total pressure on system, p. s. i. g. | 1.5 | |
|   Mole ratio MCyP+tertiary Butyl chloride | 2.4 | 2.4 |
|   Vol. ratio MCyP+tertiary Butyl chloride/96% H$_2$SO$_4$ | 3.5 | 3.5 |
| Methylcyclopentane Converted, Mole percent | 41.0 (3.57 moles) | 18.5 (1.58 moles) |
| Selectivity to, Mole percent: | | |
|   1-chloro-1-methylcyclopentane | 8.1 | 38.5 |
|   Dicyclic chloride (C$_{12}$H$_{21}$Cl) | ᵃ 55.0 | ᵃ 38.5 |
|   Dicyclic hydrocarbon (C$_{12}$H$_{22}$) | 16.0 | 6.5 |
|   Alkylated dicylic hydrocarbon | 5.5 | 4.5 |
|   In catalyst layer | 9.6 | 9.0 |
| Tertiary Butyl Chloride Converted, Mole percent | 98.0 ᵇ(3.62 moles) | 45.5 (1.61 moles) |
| Selectivity to, Mole percent: | | |
|   Isobutane | 89.7 | 80.0 |
|   In catalyst layer | 5.4 | 5.0 |

ᵃ Based on dehydrohalogenation followed by dehydrogenation the dicyclic chloride consists predominantly of chlorodimethyl decalin (fused ring).

ᵇ 2.23 mols of free HCl was produced. 1.3 moles of chlorine recovered as product.

Similar runs were made with dimethylcyclopentane to produce sizable quantities of dicyclic chlorides.

The final dicyclic chloride produce is readily dehydrochlorinated to produce the dicyclic olefin by simply heating the dicyclic chloride to temperatures above 100° C. Other methods such as, for example, treatment of the dicyclic chloride with alcoholic caustic also brings about the dehydrochlorination to form dicyclic olefins. The dicyclic olefins can be subjected to various reactions for producing desired final products as pointed out above.

It is of particular interest to note that the dicyclic olefins, produced in accordance with the described process are readily converted to aromatic hydrocarbons. For example, the dimethyloctahydronaphthalenes formed as a principal dicyclic olefin from methylcyclopentane can be dehydrogenated to dimethyl naphthalenes. The dicyclic olefins produced from the alkyl naphthenes are converted predominantly to aromatic hydrocarbons by dehydrogenation over a catalyst and under conditions which avoid splitting off hydrocarbon groups. This is demonstrated by the dehydrogenation over platinum supported on activated charcoal at 265° C. The dicyclic olefin used was obtained by dehydrochlorination of the dicyclic chloride produced by reacting methylcyclopentane with tertiary butyl chloride, dehydrogenation conditions and results being tabulated in the following Table III.

TABLE III

*Dehydrogenation of dicyclic olefins over platinum on activated charcoal at 265° C.*

| | |
|---|---|
| Charge | 27.0 gm. (C$_{12}$H$_{20}$). |
| Recovery: | |
|   Liquid | 2.40 gm. |
|   Gas | 9.22 liters of H$_2$ at 0° C. and 760 mm. |
| Product: | Approx. composition, |
|   Compound— | mole percent [1] |
|     Unconverted dicyclic olefin | 5.5 |
|     Hydrogenated dicyclic olefin | 12.5 |
|     Phenyl methylcyclopentane | 27.0 |
|     Dimethyl naphthalenes | 55.0 |

[1] Based on this breakdown, there should have been produced 9.6 liters of hydrogen assuming 4 moles H$_2$/mole dimethyl naphthalenes, 2 moles H$_2$/mole phenyl methylcyclopentane and corrected for the hydrogen consumed in the hydrogenation of the olefin. The hydrogen collected contained only a trace of light hydrocarbon.

These results clearly demonstrate that the dicyclic olefins consist largely of alkyl octahydronaphthalenes with minor amounts of cyclohexene methylcyclopentanes.

It is thus demonstrated that the present process is useful for synthesizing certain aromatic hydrocarbons that have potential value as intermediates. The dimethyl naphthalenes, such as, 2,6-dimethyl naphthalene, are desirable for forming high molecular weight dibasic acids.

Having described the invention, it is claimed:

1. A process for synthesizing a dicyclic compound from an alkylcyclopentane, which comprises reacting an alkylcyclopentane with a tertiary alkyl chloride in the presence of 85 to 100% sulfuric acid at a temperature in the range of about −10° to 25° C., and continuing reaction of the thus formed chloride of the alkylcyclopentane in the presence of the sulfuric acid while maintaining a hydrogen chloride partial pressure over the resulting reaction mixture at above 0.1 atmosphere until a substantial amount of dicyclic chloride is formed, then stopping the reaction and recovering as the reaction product a mixture comprising principally the dicyclic chloride and a dicyclic hydrocarbon formed by condensation of the chloride of the alkyl cyclopentane.

2. The process of forming a dicyclic chloride having the composition C$_{12}$H$_{21}$Cl from methylcyclopentane, which comprises reacting a major molar proportion of methylcyclopentane with tertiary butyl chloride in the presence of about 96% strength sulfuric acid at a temperature in the range of 0 to 10° C., maintaining a partial pressure of about 1.5 atmospheres of hydrogen chloride in contact with the reaction mixture while continuing reaction of the reaction mixture until a substantial amount of product formed is a dicyclic chloride having the composition C$_{12}$H$_{21}$Cl then stopping the reaction and recovering a reaction product mixture containing principally said dicyclic chloride and a dicyclic hydrocarbon having the composition C$_{12}$H$_{22}$.

3. In a process of forming dicyclic derivatives the step which comprises contacting 1-chloro-1-methylcyclopentane with 85–100% sulfuric acid at about −10°–25° C. under a partial pressure of 0.1 to 5 atmospheres of HCl until a substantial amount of the chloro-methylcyclopentane is converted to a dicyclic chloride having a composition $C_{12}H_{21}Cl$ then stopping the reaction and recovering a reaction product mixture containing principally said dicyclic chloride and a dicyclic hydrocarbon having the composition $C_{12}H_{22}$.

4. The process of forming dicyclic derivatives from an alkylcyclopentane which comprises reacting an alkylcyclopentane with a tertiary alkyl chloride in the presence of 85 to 100% sulfuric acid at a temperature of about −10° to 25° C., maintaining the resulting reaction mixture under partial pressure of 0.1 to 5 atmospheres of hydrogen chloride until a substantial amount of dicyclic hydrocarbon chloride is formed, heating the resulting dicyclic hydrocarbon chloride, removing the evolved HCl and recovering a dicyclic olefin.

5. A process for converting alkylcyclopentane to dicyclic aromatic hydrocarbon derivatives which comprises converting the alkylcyclopentane to a dicyclic chloride by reacting the alkylcyclopentane with a tertiary alkyl chloride in the presence of 85 to 100% $H_2SO_4$ while maintaining the resulting reaction mixture under a partial pressure of 0.1 to 5 atmosphere of hydrogen chloride until a substantial amount of dicyclic chloride is formed, dehydrochlorinating the thus formed dicyclic chloride by heating the dicyclic chloride to an elevated temperature, and removing hydrogen chloride evolved therefrom, and contacting the resulting dicyclic olefin with a platinum catalyst at 265° C. to selectively dehydrogenate the resulting dicyclic olefin formed from the dicyclic chloride.

References Cited in the file of this patent

UNITED STATES PATENTS

| | | |
|---|---|---|
| 1,221,382 | Schmidt | Apr. 3, 1917 |
| 2,396,486 | Ballard | Mar. 12, 1946 |
| 2,443,079 | Otto | June 8, 1948 |

OTHER REFERENCES

Beilstein: "Handbuch der Organischen Chemie," vol. 5, 1st Supplement, p. 11.